(12) United States Patent
Shawcross et al.

(10) Patent No.: US 7,481,523 B2
(45) Date of Patent: Jan. 27, 2009

(54) MONOAZO COMPOUNDS AND INKS CONTAINING THEM

(75) Inventors: Andrew Paul Shawcross, Manchester (GB); Paul Wight, Manchester (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 394 days.

(21) Appl. No.: 10/530,755

(22) PCT Filed: Sep. 19, 2003

(86) PCT No.: PCT/GB03/04024

§ 371 (c)(1),
(2), (4) Date: Oct. 12, 2005

(87) PCT Pub. No.: WO2004/033559

PCT Pub. Date: Apr. 22, 2004

(65) Prior Publication Data
US 2006/0055751 A1 Mar. 16, 2006

(30) Foreign Application Priority Data
Oct. 11, 2002 (GB) .................................. 0223601.6

(51) Int. Cl.
*G01D 11/00* (2006.01)
(52) U.S. Cl. ...................... 347/100; 523/160; 106/31.13
(58) Field of Classification Search ................. 347/100, 347/95, 96, 101; 106/31.6, 31.13, 31.27; 523/160
See application file for complete search history.

(56) References Cited

U.S. PATENT DOCUMENTS

| | | | | |
|---|---|---|---|---|
| 4,841,031 A | * | 6/1989 | Kayane et al. | ............... 534/638 |
| 5,131,917 A | * | 7/1992 | Miyamoto et al. | ............. 8/549 |
| 5,713,992 A | | 2/1998 | Satoh et al. | .................. 347/100 |
| 6,344,076 B1 | * | 2/2002 | Kenworthy | ............... 106/31.48 |
| 6,379,442 B1 | * | 4/2002 | Lavery et al. | ............ 106/31.51 |
| 6,406,527 B1 | | 6/2002 | Bauer et al. | |
| 6,432,185 B1 | * | 8/2002 | Bauer et al. | ............... 106/31.48 |

FOREIGN PATENT DOCUMENTS

| | | |
|---|---|---|
| EP | 559310 | 9/1993 |
| EP | 1 036 823 | 9/1998 |
| EP | 866105 | 9/1998 |
| JP | 60188468 | 9/1985 |
| WO | 99/01510 | 1/1999 |

OTHER PUBLICATIONS

Vol. 010, No. 036 (C-328), Feb. 13, 1986.

* cited by examiner

*Primary Examiner*—Manish S Shah
(74) *Attorney, Agent, or Firm*—Morgan Lewis Bockius LLP

(57) ABSTRACT

A compound of Formula (1) and salts thereof:

Formula (1)

wherein:
$R^1$ and $R^3$ are each independently H or optionally substituted alkyl; $R^2$ is either alkyl carrying a water-solubilising group selected from the group consisting of OH, $-(OCH_2CH_2)_q-$, where q is from 1 to 10, carboxylic acid and sulfonic acid groups and salts thereof; or a C1-12-alkyl group free from water-solubilising groups;
Y is OH, $CO_2H$, $SO_3H$ or $PO_3H_2$; and
n and m each independently have a value of 0 or 1;
provided that the compound of Formula (1) is free from fibre reactive groups. Also an ink-jet printing ink, an ink-jet printing process, a printed material and an ink jet printer cartridge.

13 Claims, No Drawings

MONOAZO COMPOUNDS AND INKS CONTAINING THEM

This invention relates to compounds, to inks and to their use in ink-jet printing ("IJP").

IJP is a non-impact printing technique in which droplets of ink are ejected through a fine nozzle onto a substrate without bringing the nozzle into contact with the substrate.

There are many demanding performance requirements for dyes and inks used in IJP. For example, they desirably provide sharp, non-feathered images having good water-fastness, light-fastness, ozone-fastness and optical density. The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle. In particular the developments in IJP technology is leading to more demanding lighffastness performance.

WO99/01510 discloses monoazo dyes carrying a hydroxy triazine group and an aryl amino group.

According to the first aspect of the present invention there is provided a compound of Formula (1) and salts thereof:

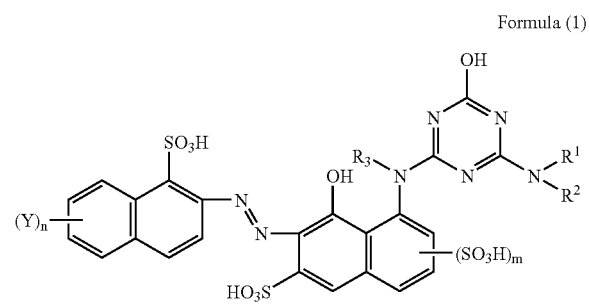

Formula (1)

wherein:
$R^1$ and $R^3$ are each independently H or optionally substituted alkyl;
$R^2$ is optionally substituted alkyl;
Y is OH, $CO_2H$, $SO_3H$ or $PO_3H_2$; and
n and m each independently have a value of 0 or 1;

provided that the compound of Formula (1) is free from fibre reactive groups.

When the compound of Formula (1) is in the form of a salt it is preferably in the form of a lithium, sodium or potassium salt or a salt with a quaternary ammonium compound, or a mixture thereof. Examples of such salts include $NH_4^+$, morpholinium, piperidinium, pyridinium, $(CH_3)_3N^+H$, $CH_3CH_2CH_2N^+H_3$, $CH_3CH_2CH_2N^+H_3$, $(CH_3)_2CHN^+H_3$, $N^+(CH_2CH_3)_4$, N-methyl pyridinium, N,N-dimethyl piperidinium and N,N-dimethyl morpholinium. Especially preferred are ammonium and substituted ammonium salts.

The preferred identity of the optionally substituted alkyl group represented by $R^2$ and optionally by $R^1$ depends to some extent on the use to which the compound of Formula (1) will be put.

When compounds of Formula (1) are intended for use in aqueous inks the optional substituted alkyl group represented by $R^1$ and/or $R^2$ preferably comprises a water-solubilising group. Preferred water-solublising groups include OH, $-(OCH_2CH_2)_q-$ where q is from 1 to 10, more preferably to 1 to 6, carboxy and sulfo containing moieties and salts thereof. More preferred water solublising groups are the ionic groups such as carboxy and sulfo containing moieties and the salts thereof. Especially preferred water solubilising ionic groups are carboxylic acid and sulfonic acid groups and salts thereof. Thus for aqueous inks the optionally substituted alkyl group represented by $R^1$ and/or $R^2$ is preferably a $C_{1-6}$-alkyl group carrying a water-solubilising group.

When compounds of Formula (1) are intended for non-aqueous inks the optionally substituted alkyl group represented by $R^1$ and/or $R^2$ is preferably hydrophobic. Preferred hydrophobic groups are free from water-solubilising groups. Thus for non-aqueous inks the optionally substituted alkyl group represented by $R^1$ and/or $R^2$ is preferably a $C_{1-12}$-alkyl group free from water-solubilising groups.

The compounds of Formula (1) are free from fibre reactive groups because there is no need for such groups to be present in the compounds and to include them would increase the cost of the compounds. Further such groups tend hydrolyse and reduce long term ink stability. The term fibre reactive group is well known in the art and is described for example in EP 0356014 A1. Fibre reactive groups are capable, under suitable conditions, of reacting with the hydroxyl groups present in cellulosic fibres or with the amino groups present in natural fibres to form a covalent linkage between the fibre and the dye. As examples of fibre reactive groups excluded from the compounds of Formula (1) there may be mentioned aliphatic sulfonyl groups which contain a sulfate ester group in the beta-position to the sulfur atom, e.g. beta-sulfato-ethylsulfonyl groups, alpha, beta-unsaturated acyl radicals of aliphatic carboxylic acids, for example acrylic acid, alpha-chloroacrylic acid, alpha-bromoacrylic acid, propiolic acid, maleic acid and mono- and dichloro maleic; also the acyl radicals of acids which contain a substituent which reacts with cellulose in the presence of an alkali, e.g. the radical of a halogenated aliphatic acid such as chloroacetic acid, beta-chloro and beta-bromopropionic acids and alpha, beta-dichloro- and dibromopropionic acids or radicals of vinylsulfonyl- or beta-chloroethylsulfonyl- or beta-sulfatoethyl-sulfonyl-endo-methylene cyclohexane carboxylic acids. Other examples of cellulose reactive groups are tetrafluorocyclobutyl carbonyl, trifluoro-cyclobutenyl carbonyl, tetrafluorocyclobutylethenyl carbonyl, trifluoro-cyclobutenylethenyl carbonyl; activated halogenated 1,3-dicyanobenzene radicals; and heterocyclic radicals which contain 1, 2 or 3 nitrogen atoms in the heterocyclic ring and at least one cellulose reactive substituent on a carbon atom of the ring, for example a triazinyl halide. It is preferred that the compounds of Formula (1) are free from fibre reactive groups such as halotriazine, vinyl sulfone and groups convertible to vinyl sulfones on treatment with aqueous alkali, e.g. beta sulfato ethyl sulfone groups.

The compounds of Formula (1) may be prepared by treatment of a compound of Formula (2) with aqueous base:

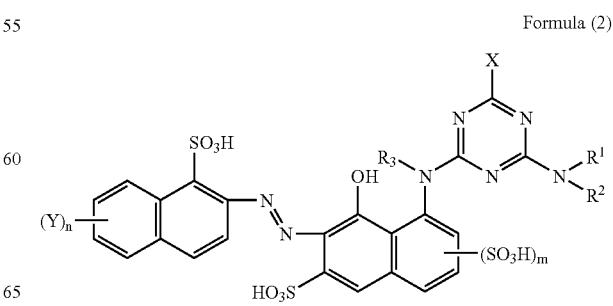

Formula (2)

wherein:

X is a halo; and $R^1$, $R^2$, $R^3$, Y, m and n are as hereinbefore defined.

The treatment with aqueous base is preferably performed at a temperature of 60 to 100° C., more preferably 70 to 90° C. Treatment times of 2 to 5 hours are typically used. Preferred aqueous bases are NaOH, KOH and DABCO.

The compounds of Formula (2) may be prepared by reacting a compound of Formula (3) with an amine of Formula $HNR^1R^2$:

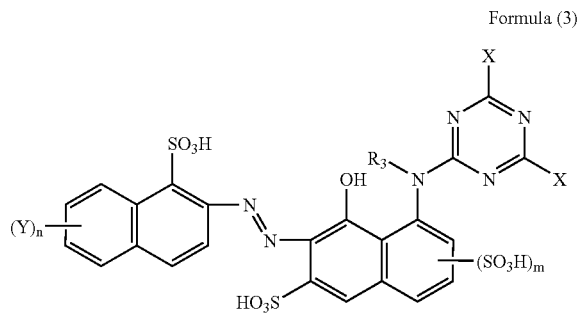

Formula (3)

wherein:

each X independently is halo and Y, n, m and $R^3$ are as hereinbefore defined.

The compounds of Formula (3) may be prepared by condensing a triazine compound carrying three groups represented by X with a compound of Formula (4):

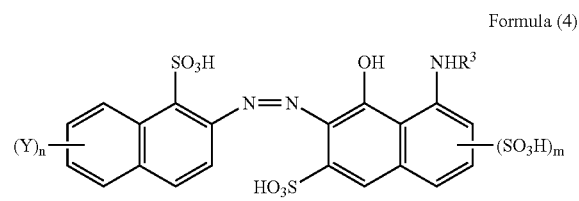

Formula (4)

wherein Y, n, m and $R^3$ are as hereinbefore defined.

The compounds of Formula (4) may be prepared by diazotising a 1-sulfo-2-amino naphthalene compound carrying nY groups to give a diazonium compound and coupling the resultant diazonium compound with a 1-hydroxy-8-amino-3-sulfo naphthalene compound optionally carrying a sulfo group at the 5-, 6- or 7-position. Typical diazotisation conditions involve treating the compound with sodium nitrite under acidic conditions at a temperature below 5° C.

The compounds of Formula (1) in salt form may be made from corresponding compounds in the free acid or different salt form using techniques known in the art. For example, an alkali metal salt of a dye may be converted into a salt with ammonia or an amine by dissolving an alkali metal salt of the dye in water, acidifying with a mineral acid and adjusting the pH of the solution to pH 9 to 9.5 with ammonia or the amine and removing the alkali metal cations by dialysis.

According to a second aspect of the present invention there is provided an ink comprising a compound of Formula (1) or salt thereof and a liquid medium.

Preferred liquid media include water, a mixture of water and an organic solvent and an organic solvent free from water.

A preferred ink comprises:

(a) from 0.01 to 30 parts of a compound of Formula (1) or salt thereof; and (b) from 70 to 99.99 parts of a medium comprising component (i), (ii) or (iii):

(i) a mixture of water and an organic solvent; or (ii) an organic solvent free from water; or (iii) a low melting point solid;

wherein all parts are by weight and the number of parts (a)+(b)=100. The number of parts of component (a) is preferably from 0.1 to 20, more preferably from 0.5 to 15, and especially from 1 to 5 parts. The number of parts of component (b) is preferably from 99.9 to 80, more preferably from 99.5 to 85, especially from 99 to 95 parts.

When the medium is a mixture of water and an organic solvent or an organic solvent free from water, preferably component (a) is completely dissolved in component (b). Preferably component (a) has a solubility in component (b) at 20° C. of at least 10%. This allows the preparation of concentrates which may be used to prepare more dilute inks and reduces the chance of the dye precipitating if evaporation of the liquid medium occurs during storage.

When the medium comprises a mixture of water and an organic solvent, the weight ratio of water to organic solvent is preferably from 99:1 to 1:99, more preferably from 99:1 to 50:50 and especially from 95:5 to 70:30.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulfoxides, preferably dimethyl sulfoxide and sulfolane. Preferably the liquid medium comprises water and 2 or more, especially from 2 to 8, water-soluble organic solvents.

Especially preferred water-miscible organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and tri-ethyleneglycol; and mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

The organic solvent may be water-immiscible, water-miscible or a mixture of such solvents. Preferred water-miscible organic solvents are any of the hereinbefore described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the dye in the liquid medium. Examples of polar solvents include $C_{1-4}$-alcohols. In view of the foregoing preferences it is especially preferred that where the liquid medium is an organic solvent free from water it comprises a ketone (especially methyl ethyl ketone) &/or an alcohol (especially a $C_{1-4}$-alkanol, more especially ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected which gives good control over the drying characteristics and storage stability of the ink.

Ink media comprising an organic solvent free from water are particularly useful where fast drying times are required and particularly when printing onto hydrophobic and non-absorbent substrates, for example plastics, metal and glass.

Preferred low melting solid media have a melting point in the range from 60° C. to 125° C. Suitable low melting point solids include long chain fatty acids or alcohols, preferably those with $C_{18-24}$ chains, and sulfonamides. The compound of Formula (1) may be dissolved in the low melting point solid or may be finely dispersed in it.

When the dyes according to the present invention exhibit solubility in aqueous media, it is preferred that the liquid medium is a mixture of water and one or more water miscible organic solvent(s).

Preferably the ink according to the second aspect of the present invention is an ink jet printing ink.

The presence of impurities in an ink jet printing ink can result in the formation of precipitates in the ink. This is undesirable because the precipitates can block the narrow ink jet nozzle in the printer. Therefore, the dye(s) according to the present invention are preferably purified to remove undesirable impurities before they are incorporated into inks for ink jet printing. Conventional techniques may be employed for purifying the dyes, for example osmosis and/or dialysis. In particular it is preferable to remove the salts responsible for fouling of the firing head. This fouling is often referred to as kogation and ions such as chloride are particularly undesirable.

Preferably the ink contains less than 500 ppm, more preferably less than 250 ppm, especially less than 100 pm, more especially less than 10 ppm in total of divalent and trivalent metal ions.

Preferably the ink has been filtered through a filter having a mean pore size below 10 μm, more preferably below 3 μm, especially below 2 μm, more especially below 1 μm. This filtration removes particulate matter that could otherwise block the fine nozzles found in many ink-jet printers.

The viscosity of the ink is preferably less than 20 mPa·s, more preferably less than 10 mPa·s, especially less than 5 mPa·s, at 25° C.

The surface tension of the ink is preferably in the range 20-65 dynes/cm, more preferably in the range 30-60 dynes/cm.

The ink may also contain additional components conventionally used in ink jet printing inks, for example viscosity and surface tension modifiers, pH buffers (e.g. 1:9 citric acid/sodium citrate) corrosion inhibitors, biocides, kogation reducing additives and surfactants which may be ionic or non-ionic.

According to a third aspect of the present invention there is provided a process for printing an image on a substrate comprising applying an ink according to the second aspect of the present invention to the substrate by means of an ink jet printer.

The ink jet printer preferably applies the ink to the substrate in the form of droplets which are ejected through a small orifice onto the substrate. Preferred ink jet printers are piezoelectric ink jet printers and thermal ink jet printers. In thermal ink jet printers, programmed pulses of heat are applied to the ink in a reservoir by means of a resistor adjacent to the orifice, thereby causing the ink to be ejected in the form of small droplets directed towards the substrate during relative movement between the substrate and the orifice. In piezoelectric ink jet printers the oscillation of a small crystal causes ejection of the ink from the orifice.

The substrate used in the third aspect of the invention is preferably paper, plastic, a textile, metal or glass, more preferably paper, an overhead projector slide or a textile material, especially paper.

According to a fourth aspect of the present invention there is provided a paper, an overhead projector slide or a textile material printed with an ink according to the second aspect of the present invention, or by means of the process according to the third aspect of the present invention.

Preferred papers are plain or treated papers which may have an acid, alkaline or neutral character. Examples of commercially available papers include, HP Premium Coated Paper, HP Photopaper (all available from Hewlett Packard Inc), Stylus Pro 720 dpi Coated Paper, Epson Photo Quality Glossy Film, Epson Photo Quality Glossy Paper (available from Seiko Epson Corp.), Canon HR 101 High Resolution Paper, Canon GP 201 Glossy Paper, Canon HG 101 High Gloss Film (all available from Canon Inc.), Wiggins Conqueror paper (available from Wiggins Teape Ltd), Xerox Acid Paper and Xerox Alkaline paper, Xerox Acid Paper (available from Xerox).

Preferred plastic films are transparent polymeric films, especially those suitable for use as overhead projector slides, for example polyesters (especially polyethylene terephthalate), polycarbonates, polyimides, polystyrenes, polyether sulfones, cellulose diacetate and cellulose triacetate films.

According to a fifth aspect of the present invention there is provided an ink jet printer cartridge comprising a chamber and an ink wherein the ink is present in the chamber and is as defined in the second aspect of the present invention. The ink jet printer cartridge is optionally refillable.

The invention is further illustrated by the following Examples in which all parts and percentages are by weight unless otherwise stated.

EXAMPLE 1

Preparation of:

Compound (1)

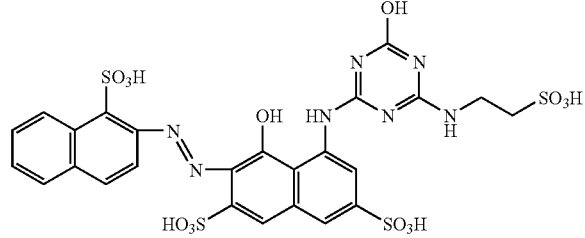

Compound (1) was prepared using the method described in WO 99/01510, Example 1, except that in place of 2-amino benzene sulfonic acid there was used taurine and the resultant dye was not converted to the ammonium salt. The resultant compound had a λmax at 532 nm.

EXAMPLE 2

Preparation of:

Compound (2)

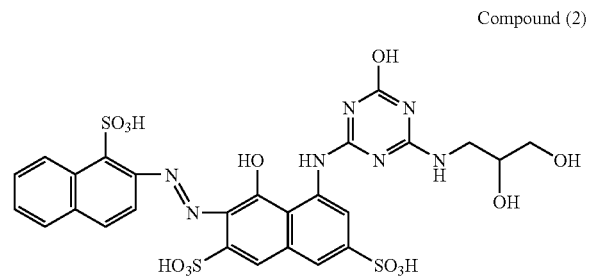

The method of Example 1 was repeated except that in place of taurine there was used 3-Amino-1,2-propanediol.

The resultant Compound (2) had a λmax at 529 nm.

COMPARATIVE EXAMPLE

Comparative Compound

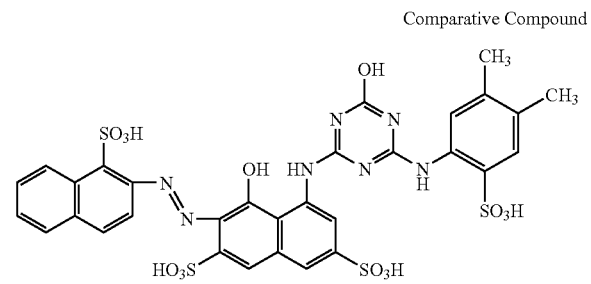

The method of Example 1 was repeated except that in place of taurine there was used 2-amino 4,5 dimethyl benzene sulfonic acid. The resultant Comparative Compound had a λmax at 519 nm.

EXAMPLE 3

Inks & Printing

Ink Jet Printing Inks were Prepared Having the Following Formulations:

Ink (1) was prepared by dissolving 2 parts of Compound (1) in 98 parts of a mixture comprising 90 parts water and 10 parts 2-pyrrolidone. The pH of the ink was 7.0.

Ink (2) and a Comparative Ink were prepared in the same manner as Ink (1) except that Compound (2) and the Comparative Compound were used respectively in place of Compound (1).

Ink Jet Printing

The inks were each separately applied to HP Premium Plus paper using a Hewlett Packard HP 660C ink jet printer.

Tests

The following tests were performed on the prints of Ink (2) and the Comparative Ink.

The optical density (OD) and CIE colour co-ordinates of each initial print (a, b, L, Chroma "C" and hue "h") were measured using a X-Rite 983™ Spectrodensitometer with 0°/45° measuring geometry, with a spectral range of 400-700 nm at 20 nm spectral intervals, using illuminant C, with a 2° (CIE 1931) observer angle and a density operation status of T. No less than 2 measurements were taken diagonally across a solid colour block on the print with a size greater than 10 mm×10 mm.

The prints were exposed to 64 hours in an Atlas Weatherometer.

After the light-fastness tests, the OD and CIE colour co-ordinates were remeasured. The degree of fade ΔE is defined as the overall change in CIE colour co-ordinates L, a, b of the print and is expressed by the equation:

$$\Delta E = (\Delta L^2 + \Delta a^2 + \Delta b^2)^{0.5}$$

The % OD loss is expressed by $\frac{(OD\ \text{INITIAL} - OD\ \text{FADE})}{OD\ \text{INITIAL}} \times 100$ Best light fastness corresponds to lowest ΔE and % OD loss values.

|  | OD INITIAL | % OD LOSS | ΔE |
|---|---|---|---|
| Comparative Ink | 1.078 | 74% | 49 |
| Comparative Ink | 0.498 | 72% | 34 |
| Ink (2) | 1.096 | 45% | 26 |
| Ink (2) | 0.558 | 44% | 20 |

As can be seen, the Compound (2) of the present invention in Ink (2) gives excellent light fastness.

EXAMPLE 4

The inks described in Tables I and II may be prepared wherein the compound described in the first column is the compound made in the above Example of the same number. Numbers quoted in the second column onwards refer to the number of parts of the relevant ingredient and all parts are by weight. The inks may be applied to paper by thermal or piezo ink jet printing.

The following abbreviations are used in Table I and II:

PG=propylene glycol DEG=diethylene glycol
NMP=N-methyl pyrrolidone DMK=dimethylketone
IPA=isopropanol MEOH=methanol
2P=2-pyrollidone MIBK=methylisobutyl ketone
P12=propane-1,2-diol BDL=butane-2,3-diol
CET=cetyl ammonium bromide PHO=$Na_2HPO_4$ and
TBT=tertiary butanol TDG=1,3-bis(2-hydroxyethyl) urea

TABLE I

| Compound | Compound Content | Water | PG | DEG | NMP | DMK | NaOH | Na Stearate | IPA | MEOH | 2P | MIBK |
|---|---|---|---|---|---|---|---|---|---|---|---|---|
| 1 | 2.0 | 80 | 5 | | 6 | 4 | | | | | 5 | |
| 2 | 3.0 | 90 | | 5 | 4.8 | | 0.2 | | | | | |
| 1 | 10.0 | 85 | 3 | | 3 | 3 | | | | 5 | 1 | |
| 2 | 2.1 | 91 | | 8 | | | | | | | | 1 |
| 1 | 3.1 | 86 | 4.8 | | | | | 0.2 | 4 | | | 5 |
| 2 | 1.1 | 81 | | | 9 | | 0.5 | 0.5 | | | 9 | |
| 1 | 2.5 | 60 | 4 | 15 | 3 | 3 | | | 6 | | 5 | 4 |
| 2 | 5 | 65 | | 20 | | | | | 10 | | | |
| 1 | 2.4 | 75 | 5 | 4 | | 5 | | | | 6 | | 5 |
| 2 | 4.1 | 80 | 3 | 5 | 2 | 9.7 | | 0.3 | | | | |
| 1 | 3.2 | 65 | | 5 | 4 | 6 | | | 5 | 4 | 6 | 5 |
| 2 | 5.1 | 96 | | | | | | | | 4 | | |
| 1 | 10.8 | 90 | 5 | | | | | | 5 | | | |
| 2 | 10.0 | 80 | 2 | 6 | 2 | 5 | | | 1 | | 4 | |
| 1 | 1.8 | 80 | | 5 | | | | | | | 15 | |
| 2 | 2.6 | 84 | | | 11 | | | | | | 5 | |
| 1 | 3.3 | 80 | 2 | | | 10 | | | | 2 | | 6 |
| 2 | 12.0 | 90 | | | | 6.7 | 0.3 | | 3 | | | |
| 1 | 5.4 | 69 | 2 | 20 | 2 | 1 | | | | | 3 | 3 |
| 2 | 6.0 | 91 | | | 4 | | | | | | 5 | |

TABLE II

| Compound | Dye Compound | Water | PG | DEG | NMP | CET | TBT | TDG | BDL | PHO | 2P | P12 |
|---|---|---|---|---|---|---|---|---|---|---|---|---|
| 1 | 3.0 | 80 | 15 | | | 0.2 | | | | | 4.8 | |
| 2 | 9.0 | 90 | | 5 | | | | | | 1.2 | | 3.8 |
| 1 | 1.5 | 85 | 5 | 5 | | 0.15 | 4.65 | 0.2 | | | | |
| 2 | 2.5 | 90 | | 6 | 3.88 | | | | | 0.12 | | |
| 1 | 3.1 | 82 | 4 | 7.7 | | 0.3 | | | | | | 6 |
| 2 | 0.9 | 85 | | | 10 | | | | 4.8 | 0.2 | | |
| 1 | 8.0 | 90 | | 5 | 4.7 | | | 0.3 | | | | |
| 2 | 4.0 | 70 | | 10 | 4 | | | | 1 | | 4 | 11 |
| 1 | 2.2 | 75 | 4 | 10 | 3 | | | | 2 | | 6 | |
| 2 | 10.0 | 91 | | | 6 | | | | | | 3 | |
| 1 | 9.0 | 76 | | 9 | 7 | | 3.0 | | | 0.95 | 4.05 | |
| 2 | 5.0 | 78 | 5 | 11 | | | | | | | 6 | |
| 1 | 5.4 | 86 | | | 7 | | | | | | 7 | |
| 2 | 2.1 | 70 | 5 | 5 | 5 | 0.1 | 0.2 | 4.6 | 5 | 0.1 | 5 | |
| 1 | 2.0 | 90 | | | 10 | | | | | | | |
| 2 | 2 | 88 | | | 2 | | | 10 | | | | |
| 1 | 5 | 78 | | | 5 | | | 12 | | | 5 | |
| 2 | 8 | 70 | 2 | | 8 | | | 15 | | | 5 | |
| 1 | 10 | 80 | | | | | | 8 | | | 12 | |
| 2 | 10 | 80 | | | 10 | | | | | | | |

The invention claimed is:

1. A compound of Formula (1) and salts thereof:

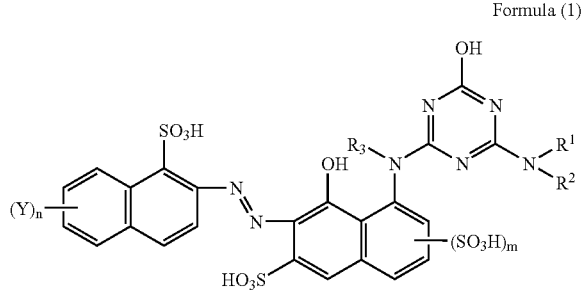

Formula (1)

wherein:
- $R^1$ and $R^3$ are each independently H or optionally substituted alkyl;
- $R^2$ is either alkyl carrying a water-solubilising group selected from the group consisting of OH, —$(OCH_2CH_2)_q$—, where q is from 1 to 10, carboxylic acid and sulfonic acid groups and salts thereof; or a $C_{1-12}$-alkyl group free from water-solubilising groups;
- Y is OH, $CO_2H$, $SO_3H$ or $PO_3H_2$; and
- n and m each independently have a value of 0 or 1;

provided that the compound of Formula (1) is free from fibre reactive groups.

2. A compound according to claim 1 wherein the compound of Formula (1) is in the form of a lithium, sodium, potassium or quaternary ammonium salt, or a mixture thereof.

3. A compound according to claim 1 wherein $R^1$ and/or $R^2$ comprise a water-solubilising group.

4. A compound according to claim 3 wherein the water-solubilising group is ionic.

5. A compound according to claim 1 wherein $R^1$ and/or $R^2$ is a $C_{1-12}$-alkyl group free from water-solubilising groups.

6. An ink comprising a compound according to claim 1 and a liquid medium.

7. An ink comprising:
   (a) from 0.01 to 30 parts of a compound according to claim 1; and
   (b) from 70 to 99.99 parts of a medium comprising component (i), (ii) or (iii):
      (i) a mixture of water and an organic solvent; or
      (ii) an organic solvent free from water; or
      (iii) a low melting point solid;
wherein all parts are by weight and the number of parts (a)+(b)=100.

8. An ink jet printing ink according to either claim 6 or 7.

9. A process for printing an image on a substrate comprising applying an ink according to claim 8 to the substrate by means of an ink jet printer.

10. A paper, an overhead projector slide or a textile material printed with an ink according to claim 8.

11. An ink jet printer cartridge containing an ink according to claim 8.

12. A paper, an overhead projector slide or a textile material printed by a process according to claim 9.

13. A compound according to claim 3 wherein $R^2$ is alkyl carrying a water-solubilising group selected from the group consisting of OH, —$(OCH_2CH_2)_q$—, where q is from 1 to 10, carboxylic acid and sulfonic acid groups and salts thereof.

* * * * *